United States Patent
Hirano et al.

(10) Patent No.: US 9,914,528 B2
(45) Date of Patent: Mar. 13, 2018

(54) AIRFRAME-INTEGRATED PROPELLER-DRIVEN PROPULSION SYSTEMS

(71) Applicant: EMBRAER S.A., São José dos Campos—SP (BR)

(72) Inventors: Helio Hirano, São José dos Campos—SP (BR); Luis Gustavo Trapp, São José dos Campos—SP (BR)

(73) Assignee: EMBRAER S.A., São José dos Campos, SP (BR)

( * ) Notice: Subject to any disclaimer, the term of this patent is extended or adjusted under 35 U.S.C. 154(b) by 225 days.

(21) Appl. No.: 14/631,423

(22) Filed: Feb. 25, 2015

(65) Prior Publication Data

US 2016/0244150 A1    Aug. 25, 2016

(51) Int. Cl.
| | |
|---|---|
| *B64C 11/46* | (2006.01) |
| *B64C 5/02* | (2006.01) |
| *B64C 5/06* | (2006.01) |
| *B64D 27/04* | (2006.01) |
| *B64D 27/10* | (2006.01) |
| *B64C 23/00* | (2006.01) |

(52) U.S. Cl.
CPC ............ *B64C 11/46* (2013.01); *B64C 5/02* (2013.01); *B64C 5/06* (2013.01); *B64D 27/04* (2013.01); *B64D 27/10* (2013.01); *B64C 23/005* (2013.01)

(58) Field of Classification Search
CPC .................................. B64C 11/46; B64C 5/02
USPC ............................................ 244/65, 87, 91
See application file for complete search history.

(56) References Cited

U.S. PATENT DOCUMENTS

| | | | | |
|---|---|---|---|---|
| 3,018,987 | A * | 1/1962 | Multhopp | ................ B64C 9/38 244/15 |
| 3,181,810 | A * | 5/1965 | Olson | ................ B64C 29/0033 244/66 |
| 3,195,837 | A * | 7/1965 | Alvarez-Calderon | .... B64C 9/00 244/55 |
| 3,244,246 | A * | 4/1966 | Weiland | ................ B60V 1/22 244/23 B |
| 3,415,468 | A * | 12/1968 | Labombarde | ........... B64C 11/00 244/13 |
| 3,807,665 | A * | 4/1974 | Coombe | ................ B64D 27/00 244/55 |
| 4,486,146 | A | 12/1984 | Campion | |
| 4,966,338 | A * | 10/1990 | Gordon | ................ B64C 23/06 244/130 |

(Continued)

OTHER PUBLICATIONS

PCT/BR2016/000016, International Search Report and Written Opinion, dated May 19, 2016.

*Primary Examiner* — Marc Burgess
(74) *Attorney, Agent, or Firm* — Nixon & Vanderhye P.C.

(57) ABSTRACT

Propeller-driven craft (e.g., aircraft) are provided with at least one propulsion system having at least one engine and at least one aerial tractor propeller which generates a propeller propwash airflow when driven by the engine. At least one airfoil is disposed in the propeller propwash airflow of the at least one aerial tractor propeller. The airfoil is contoured and oriented relative to a swirl rotation angle ($\omega$) of the propeller propwash airflow in order to induce a forward force component on the craft in response to the propeller propwash airflow over the at least one airfoil, thus improving the craft's performance and/or reducing fuel consumption.

10 Claims, 4 Drawing Sheets

(56) References Cited

U.S. PATENT DOCUMENTS

| | | | | |
|---|---|---|---|---|
| 5,779,191 A | * | 7/1998 | Brislawn | B64C 5/02 244/194 |
| 5,873,545 A | * | 2/1999 | Kapin | B60V 3/08 244/100 A |
| 6,276,633 B1 | * | 8/2001 | Balayn | B64C 29/0033 244/56 |
| 7,581,696 B2 | * | 9/2009 | Morgan | B64C 5/02 244/45 R |
| 8,256,709 B2 | * | 9/2012 | Negulescu | B64D 27/08 244/54 |
| 8,579,230 B2 | * | 11/2013 | Diochon | B64D 29/04 244/54 |
| 9,120,552 B2 | * | 9/2015 | Kreshchishin | B64C 1/26 |
| 2013/0020433 A1 | | 1/2013 | Hoisington | |
| 2017/0233060 A1 | * | 8/2017 | Glover | B64C 5/02 244/54 |

\* cited by examiner

A## AIRFRAME-INTEGRATED PROPELLER-DRIVEN PROPULSION SYSTEMS

FIELD

The present invention is related to propeller-driven craft (e.g., aircraft) comprising one or more propulsion systems with tractor propellers.

BACKGROUND

Relative to the trajectory of motion, cross flow wind components can be used to generate forward thrust in an airfoil. It is the principle used in sailboats, which are pushed against the wind, when a certain minimum angle is formed between the wind direction and the sailboat trajectory.

In the 1970's the NASA's scientist Richard Whitcomb developed the concept of 'winglets' which are now widely employed in aircraft designs. They are based in the same principle of the sailboats. Relative to the aircraft's wing, the winglets are smaller airfoils which are placed on the wingtips in nearly vertical position. The winglets take advantage of the cross flow originated at the wingtips to generate forward thrust forces.

On the other side, single disk propellers generate a significant swirl component in the downstream flow, the resulting rotation angle, $\omega$, being a function of the propeller thrust coefficient. As a rough order of magnitude, $\omega$ varies between 20 degrees at take-off power to about 5 degrees for cruise conditions.

The energy associated to the swirl of the propeller downstream flow represents a loss of propulsive efficiency. It can be partially recovered by stators or vanes installed behind the propeller, as it is the case of fans contained in nacelles of jet engines.

Another way of recovering the propeller swirl energy is by a proper integration of the propulsion system onto the vehicle airframe, as is described hereafter with reference to the embodiments of the invention.

SUMMARY

In general, the embodiments disclosed herein are directed to the recovery of propeller propwash airflow (swirl) energy by integration of the propulsion system onto the vehicle airframe. More specifically, the embodiments disclosed herein are directed toward propeller-driven craft (e.g., aircraft) that are provided with at least one propulsion system having at least one engine and at least one aerial tractor propeller which generates a propeller propwash airflow when driven by the engine. At least one airfoil is disposed in the propeller propwash airflow of the at least one aerial tractor propeller. The airfoil is contoured and oriented relative to a swirl rotation angle ($\omega$) of the propeller propwash airflow in order to induce a forward force component on the craft in response to the propeller propwash airflow over the at least one airfoil.

The craft may comprise at least two propellers which are counter-rotatable relative to one another. Alternatively, the craft may comprise at least two propellers which are co-rotatable relative to one another.

According to certain embodiments, the craft will be an aircraft having port and starboard tractor propeller propulsion systems. The airfoil of such aircraft may therefore be embodied in port and starboard horizontal tail airfoils, the port and starboard horizontal tail airfoils being oriented relative to swirl rotation angles ($\omega$) of port and starboard propeller propwash airflows of the port and starboard tractor propulsion systems to induce forward force components on the aircraft in response to the port and starboard propeller propwash airflows over the port and starboard horizontal tail airfoils, respectively.

The port and starboard tractor propeller propulsion systems may be attached to the port and starboard horizontal tail airfoils near a respective terminal end thereof.

According to some embodiments, the aircraft will comprise port and starboard tractor propeller propulsion systems, port and starboard horizontal tail airfoils and port and starboard vertical tail airfoils. Each of the port and starboard horizontal tail airfoils and the port and starboard vertical tail airfoils may therefore be oriented relative to port and starboard swirl rotation angles ($\omega$) of the port and starboard propeller propwash airflows to induce respective forward force components on the aircraft in response to the port and starboard propeller propwash airflows over the port and starboard horizontal and vertical tail airfoils. In such embodiments, the port and starboard tractor propeller propulsion systems are attached respectively to the port and starboard horizontal tail airfoils near terminal ends thereof.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

Figure 3:
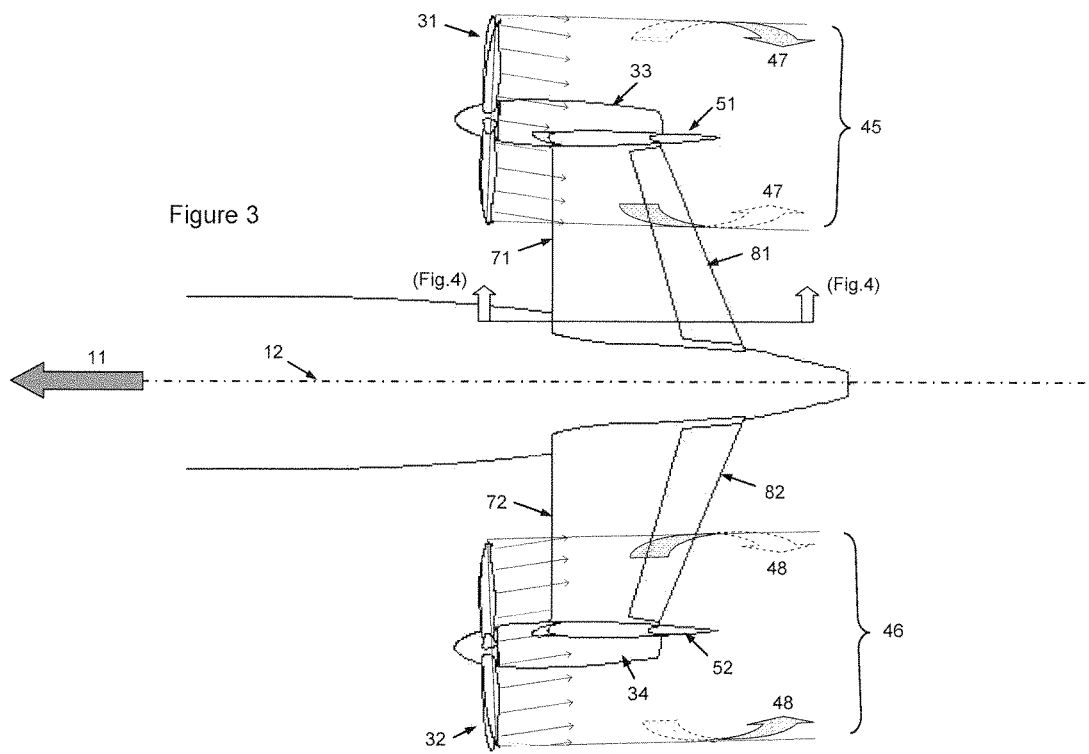
FIG. 3 is an enlarged top plan view of the rear airframe region of the aircraft depicted in FIG. 1 showing the twin-engine propeller-driven propulsion systems mounted at respective terminal ends of each of the port and starboard horizontal stabilizers.
Figure 4:
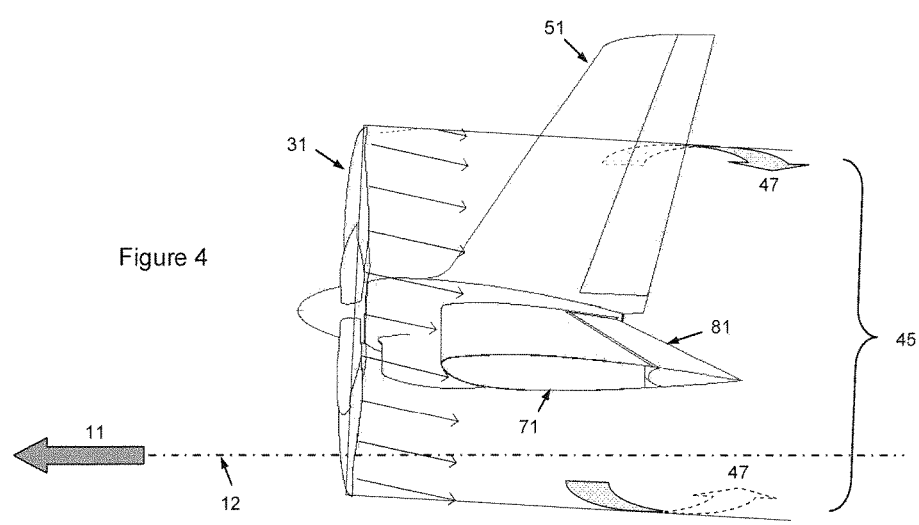
FIG. 4 is an enlarged side view of the starboard assembly of the tail airfoils and propeller-driven propulsion system of the aircraft as taken along lines 4-4 in FIG. 3.
Figure 5:
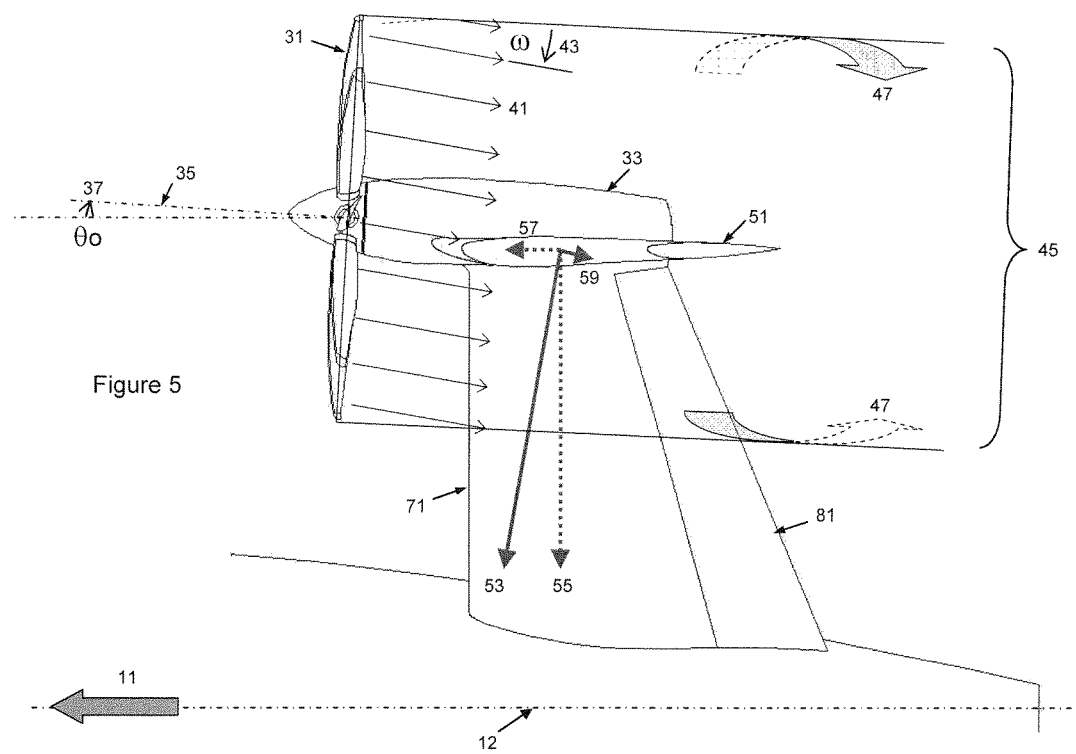
Figure 6:
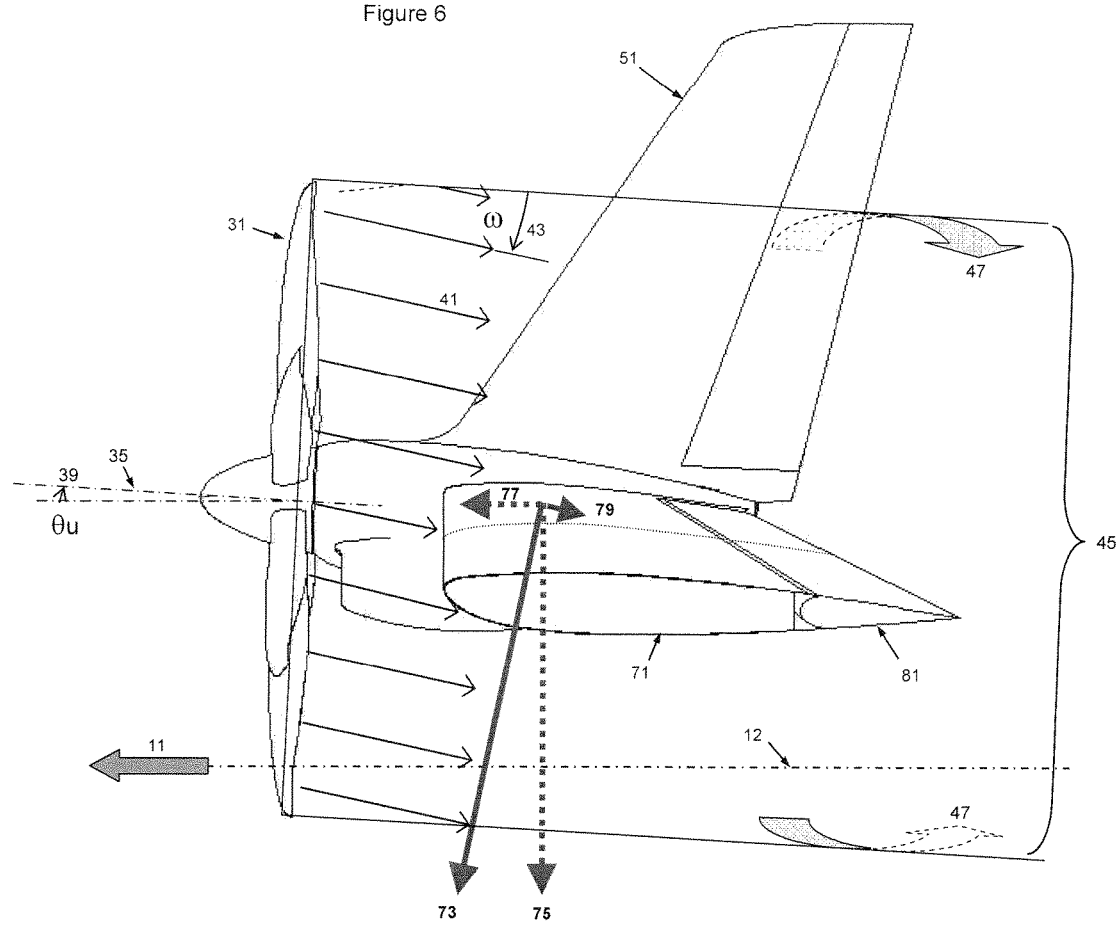

FIG. 5 is a further enlarged top plan view of the starboard assembly of the tail airfoils and propeller-driven propulsion system as depicted in FIG. 3 schematically showing the aerodynamic force components developed on the starboard vertical tail airfoil due to the propeller propwash airflow; and FIG. 6 is a further enlarged side view of the starboard assembly of the tail airfoils and propeller-driven propulsion system of the aircraft depicted in FIG. 4 schematically snowing the aerodynamic force components developed on the starboard horizontal tail airfoil due to the propeller propwash airflow.

DETAILED DESCRIPTION

The present invention is related to propeller-driven craft (e.g., aircraft) comprising one or more propulsion systems with tractor propellers. More specifically, the invention described herein is basically embodied in the aerodynamic integration of the propulsion systems with the airframe, aiming to recover part of the energy of the propellers swirls, thus improving the energetic efficiency of the vehicle.

The embodiment disclosed here, while relevant, is also an exemplary one. Therefore, the invention is not limited to the specifically disclosed embodiment. The embodiment disclosed herein is a configuration of a twin engine propeller aircraft, whose propulsion systems are installed at the ends of the horizontal tail airfoils.

Figure 1:
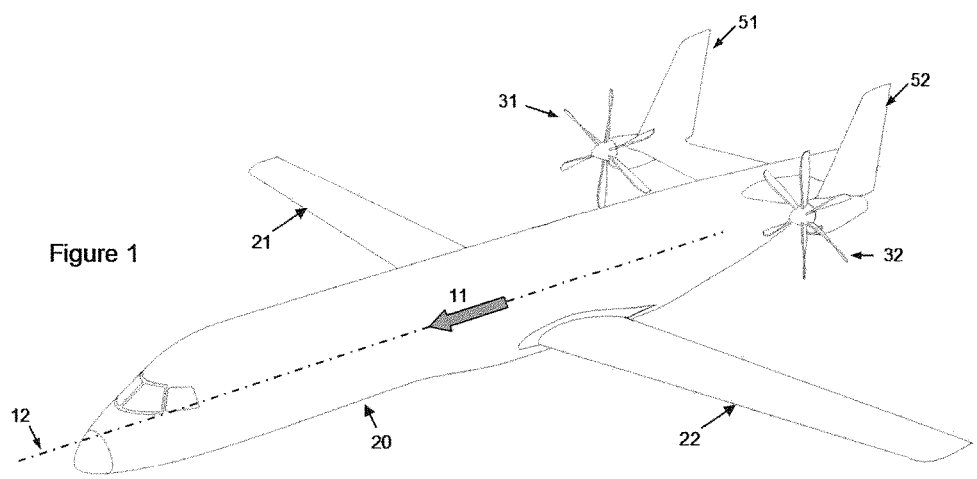
FIG. 1 is a perspective view of an aircraft with an integrated propeller-driven propulsion system according to an embodiment of the invention.
Figure 2:
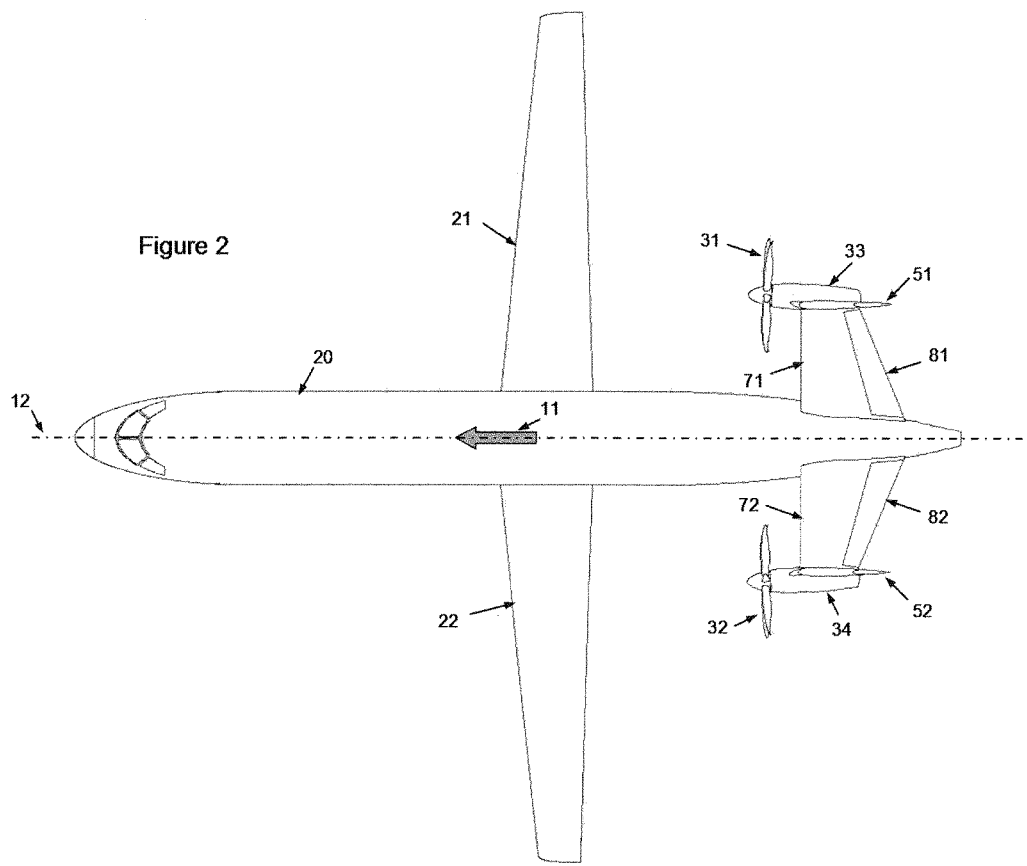
FIG. 2 is top plan view of the aircraft depicted in FIG. 1.

FIG. 1 shows a perspective view, and FIG. 2 shows the plan view of an exemplary aircraft configuration embodying the invention. The flight direction is indicated by the arrow (11).

The disclosed aircraft configuration features an elongated fuselage (20) and is provided with aerodynamic airfoils including starboard and port wing airfoils (21) and (22), starboard and port horizontal tail airfoils (71) and (72), starboard and port vertical tail airfoils (51) and (52).

The fuselage (20) defines a central axis (12) of the aircraft, referred here as x-body axis.

The starboard and port engine's housings (33) and (34) are respectively installed at the ends of the horizontal tail airfoils (71) and (72), with tractor propellers in front of these airfoils. The starboard and port propellers, shall have opposite rotating directions.

Vertical tail airfoils (51) and (52) are installed behind the propellers in the disclosed embodiment, but within the scope of the proposed invention, other embodiments may have different tail configuration.

FIG. 3 shows a plan view of the rear part of the aircraft configuration, and FIG. 4 shows a side view of the right hand (starboard) assembly of the tail airfoils and the propulsion system. As shown in these figures, large portions of the horizontal and vertical tail airfoils are immersed in the propwash (propeller downstream flow) of their respective propeller.

The curved arrows (47) and (48), in the FIGS. 3 and 4, indicate the sense of rotation of the propwash. That is: counterclockwise behind the starboard propeller and clockwise behind the port propeller.

FIG. 5 shows an enlarged plan view of the right hand side (starboard) propulsion system (33) installed at the end of the horizontal tail airfoil (71). This figure aims to illustrate the thrust force component originated in the vertical tail airfoil (51) due to the propwash (45).

The propeller axis (35) in the plan view is canted outwards relative to the aircraft x-body axis (12). This cant angle (37) is the toe-out angle, θo, of the propeller disk (31).

The toe-out angle, θo, usually is set to align the propeller disk (31) with the incoming airflow, which has been disturbed upstream by the airframe. In the plan view, θo is typically lower than 5 degrees. The toe-out angle θo depends on the airframe geometry. Some embodiments, however, may not have a toe-out angle θo.

The propeller rotation direction is such that its swirl rotation angle (43) cause an increased inward flow incidence to the vertical tail airfoil (51), thus increasing its inward aerodynamic force component (53).

The magnitude of the swirl rotation angle, ω, of the propwash (45) depends on the thrust coefficient. Also, ω varies along the propeller blade span.

Thus, the local angles of aerodynamic incidence on the vertical tail airfoil are formed by the combination of its geometric incidence angle, relative to the x-body axis (12), plus the swirl rotation angle (43), plus the propeller toe-out angle (37). Moreover, the aerodynamic interference of the horizontal tail airfoil, may change significantly the local angles of aerodynamic incidence on the vertical tail.

For a given flight condition, the local angles of aerodynamic incidence are variable along the vertical tail span.

Besides the swirl effect, the downstream flow (45) behind the propeller disk (31) has an increased dynamic pressure, being function of the thrust coefficient. Typically, the downstream flow dynamic pressure can be 20% higher in climb thrust and about 8% higher in cruise thrust.

Therefore, inside the propwash (45), the vertical tail airfoil (51) generates an aerodynamic force (53) which is perpendicular to the local airflow direction (41). This force is decomposed in a transverse component (55), which is normal to the aircraft x-body axis (12), and a longitudinal forward component (57), parallel to the aircraft x-body axis (12).

Besides the force component (53) perpendicular to the local airflow (41), there is a force component (59) parallel to the local airflow (41), which is the drag generated by the propwash (45) on the vertical tail airfoil (51).

The vertical tail airfoil (51) is purposely contoured to maximize the result of the vector addition of the force components (57) and (59), therefore resulting in the most favorable forward thrust force. Since these force components are variable along the aircraft flight envelope, several flight conditions shall be considered.

Usually, the airfoil sections of vertical tails are symmetrical and do not have a twist angle (that is: variation of geometric incidence angle from root to tip). However, according to the statement of the previous paragraph, in the exemplary embodiment, the airfoil sections are cambered inward and a twist angle may be featured.

The discussion above explains the forces generated in the vertical tail airfoil located in the right hand side (starboard) of the aircraft. An analogous explanation is applicable to the vertical tail airfoil in the left hand side (port), since it is a mirror image of the right hand side.

The same rationale used for the vertical tail design can also be applied to the horizontal tail. FIG. 6 shows an enlarged side view of the right hand (starboard) propulsion system installed at the tip of the horizontal tail (71). It illustrates the thrust force components in the horizontal tail (71) that appears due to the propwash (45).

The propeller axis (35) in side view is canted upwards relative to the aircraft x-body axis (12). This cant angle (39) is the upthrust angle (θu) of the propeller.

The propeller upthrust angle, θu, usually is set to align the propeller disk (31) to the incoming airflow, which is mostly affected by the wing (21) downwash.

In the side view the propeller upthrust angle, θu, is typically lower than 5 degrees. The propeller upthrust angle θu depends on the airframe geometry and the position of the propeller disk. Some embodiments may not have a propeller upthrust angle θu.

The propeller direction of rotation is such that its swirl rotation angle (43) causes an increased downward flow incidence on the horizontal tail (71), thus increasing its downward aerodynamic force (73).

As already mentioned previously, the swirl rotation angle (43), of the propwash (45) depends on the thrust coefficient. Also, the swirl rotation angle (43) varies along the propeller blade span.

Thus, the local angles of aerodynamic incidence on the horizontal tail airfoil are formed by the combination of its geometric incidence angle, relative to the x-body axis (12), plus the swirl rotation angle (43), plus the propeller upthrust angle (39). Moreover, the aerodynamic interference of the vertical tail airfoil, may change significantly the local angles of aerodynamic incidence on the horizontal tail.

For a given flight condition, the local angles of aerodynamic incidence are variable along the horizontal tail span.

As stated above, besides the swirl effect, the downstream flow behind the propeller has an increased dynamic pressure, being a function of the thrust coefficient. Therefore, inside the propwash (45), the horizontal tail airfoil (71) generates an aerodynamic force (73) perpendicular to the local aerodynamic flow direction (41). This force is decomposed in its transverse component (75), which is normal to the aircraft x-body axis (12), and a longitudinal forward component (77), parallel to the aircraft x-body axis (12).

Besides the force component (73) perpendicular to the local airflow (41), there is a force component (79) parallel to the local airflow (41), which is the drag generated by the propwash (45) on the horizontal tail airfoil (71).

The horizontal tail airfoil (71) is purposely contoured to maximize the result of the vector addition of the force components (77) and (79), therefore resulting in the most favorable forward thrust force. Since these force components are variable along the aircraft flight envelope, several flight conditions shall be considered.

According to the statement in the previous paragraph, in the exemplary embodiment, besides the use of cambered sections in the horizontal tail airfoils, a particular twist angle may be featured (that is: variation of geometric incidence angle from root to tip).

The discussion above explain the forces generated in the right side (starboard) airfoil of the horizontal tail. An analogous explanation is applicable to the left side (port) airfoil of the horizontal tail, since it is a mirror image of the right side.

Besides the lift generated by the angle of attack distribution on the horizontal tail, the elevators (81) and (82) shall provide adequate trimming and longitudinal control of the aircraft in any flight condition.

Moreover, the propulsion systems may have the opportunity to be purposely specified to better suit the integration with the airframe, aiming to improve the fuel efficiency of the vehicle.

As noted above, the invention herein is not to be limited to the disclosed embodiment, but on the contrary, is intended to cover various modifications and equivalent arrangements included within the spirit and scope of the appended claims.

What is claimed is:

1. A propeller-driven aircraft comprising:
    a fuselage defining an x-body axis oriented in a direction of flight;
    a horizontal tail having port and starboard sides relative to the x-body axis of the fuselage, each of the port and starboard sides of the horizontal tail having a proximal end immovably fixed to the fuselage and extending outwardly from the fuselage to an opposed terminal end thereof; and
    port and starboard propulsion systems mounted at the terminal ends of the port and starboard sides of the horizontal tail, respectively, wherein
    each of the port and starboard propulsion systems comprise an engine and an aerial tractor propeller mounted forwardly of the respective port and starboard sides of the horizontal tail, wherein
    each propeller is unducted and comprised of a single disc which generates a propeller propwash airflow with a swirl rotation angle ($\omega$) when driven by the engine; and wherein
    the port and starboard sides of the horizontal tail are disposed in the respective propeller propwash airflow of the aerial tractor propellers of the port and starboard propulsion systems, and wherein
    each of the port and starboard sides of the horizontal tail are contoured and oriented relative to the swirl rotation angle ($\omega$) of the respective propeller propwash airflow of the port and starboard propulsion systems thereby responsively generating aerodynamic forces which are perpendicular to the propwash airflow direction, and wherein
    the aerodynamic forces have transverse force components that are transverse to the x-body axis of the aircraft and forward force components that are parallel to the x-body axis of the aircraft and greater than drag force components to thereby induce additional forward thrust forces on the aircraft in response to the port and starboard propeller propwash airflows over the port and starboard sides of the horizontal tail, respectively.

2. The propeller-driven aircraft as in claim 1, wherein each aerial tractor propeller of the port and starboard propulsion systems is counter-rotatable relative to one another.

3. The propeller-driven aircraft as in claim 2, wherein the aircraft further comprises port and starboard vertical tail airfoils extending upwardly from the terminal ends of the port and starboard sides of the horizontal tail, respectively.

4. The propeller-driven aircraft according to claim 3, wherein
    each of the port and starboard vertical tail airfoils are contoured and oriented relative to the port and starboard swirl rotation angles ($\omega$) of the port and starboard propeller propwash airflows in order to induce respective forward force components on the aircraft in response to the port and starboard propeller propwash airflows over the port and starboard vertical tail airfoils, wherein
    the forward force components that are parallel to the x-body axis of the aircraft and greater than drag force components induce additional forward thrust forces on the aircraft in response to the port and starboard propeller propwash airflows over the port and starboard vertical tail airfoils, respectively, which are in addition to the thrust forces generated on the horizontal tail by the port and starboard propeller propwash airflows.

5. The propeller-driven aircraft according to claim 3, wherein each of the port and starboard propulsion systems is canted outwardly so as to establish a toe-out angle ($\theta o$) of the port and starboard propeller discs relative to the x-body axis of the fuselage.

6. The propeller-driven aircraft according to claim 3, wherein each of the port and starboard vertical tail airfoils is inwardly cambered.

7. The propeller-driven aircraft according to claim 6, wherein each of the port and starboard vertical tail airfoils has a twist angle from a root of the vertical tail airfoil adjacent to a respective one of the port and starboard sides of the horizontal tail to the terminal ends thereof.

8. The propeller-driven aircraft according to claim 2, wherein each of the port and starboard propulsion systems is canted upwardly so as to establish a propeller upthrust angle ($\theta u$) of the port and starboard propeller discs relative to the x-body axis of the fuselage.

9. The propeller-driven aircraft according to claim 1, wherein the horizontal tail comprises an elevator control surface.

10. The propeller-driven aircraft according to claim 9, wherein the port and starboard sides of the horizontal tail respectively comprise port and starboard elevator control surfaces.

* * * * *